US008626338B1

(12) United States Patent
Hagen et al.

(10) Patent No.: US 8,626,338 B1
(45) **Date of Patent: *Jan. 7, 2014**

(54) PUBLIC USE PET TAG MARKING KIOSK

(75) Inventors: George Lynn Hagen, Flagstaff, AZ (US); Beth Cooperrider, Flagstaff, AZ (US); Ronald E. Mundt, Scottsdale, AZ (US); Darren L. Kessner, Phoenix, AZ (US); Steven J. Gardner, Phoenix, AZ (US); Adrian Spucces, Phoenix, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/953,998

(22) Filed: Nov. 24, 2010

Related U.S. Application Data

(63) Continuation of application No. 12/115,346, filed on May 5, 2008, now Pat. No. 7,894,935.

(60) Provisional application No. 60/915,739, filed on May 3, 2007.

(51) Int. Cl.

| | |
|---|---|
| ***G06F 17/00*** | (2006.01) |
| ***G06F 19/00*** | (2011.01) |
| ***G07F 11/00*** | (2006.01) |
| ***G07F 11/10*** | (2006.01) |
| ***B65H 3/00*** | (2006.01) |

(52) U.S. Cl.
USPC ........... 700/231; 700/225; 700/235; 700/242; 700/134; 221/9; 221/17; 221/134; 221/191

(58) Field of Classification Search
USPC ......... 700/225, 231, 235, 236, 242, 243, 245; 221/9, 17, 134, 191
See application file for complete search history.

(56) References Cited

U.S. PATENT DOCUMENTS

| | | | |
|---|---|---|---|
| 458,325 | A | 8/1891 | Gifford |
| 481,983 | A | 9/1892 | Thom |
| 1,059,545 | A | 4/1913 | Kunze |
| 1,938,375 | A | 12/1933 | Coffee |
| 2,142,034 | A | 12/1938 | Patrick |
| 2,182,551 | A | 12/1939 | Edwards |
| 2,646,725 | A | 7/1953 | Brynildsrud |
| 2,801,555 | A | 8/1957 | Freeland et al. |
| 3,088,729 | A | 5/1963 | Marcus |
| 3,436,072 | A | 4/1969 | Svenson |
| 4,254,552 | A | 3/1981 | Samis |
| 4,437,150 | A | 3/1984 | Dahlgren, Jr. et al. |
| 4,437,557 | A | 3/1984 | Kolbl |

(Continued)

*Primary Examiner* — Kavita Padmanabhan
*Assistant Examiner* — Darrin Dunn
(74) *Attorney, Agent, or Firm* — Booth Udall Fuller, PLC

(57) ABSTRACT

Implementations of a public use tag marking kiosk. Aspects associated with particular implementations of a tag marking kiosk comprise, among others, automatically marking two sides of a tag within the kiosk, receiving the tag to be marked from the customer, providing a closeable door between the marking implement and the customer while the tag is being marked, ejecting the tag from a tag holder after the tag is marked, and aligning the tag so that a desired tag side is required to be initially facing up on the tag holder. Housing for the kiosk may surround all of the system parts or may be split into a housing shell and a marking unit that fits inside the shell. Marking implements may be laser, mechanical stylus, paint, or others. Tags may be suspended in a cantilevered manner during marking.

21 Claims, 11 Drawing Sheets

(56) References Cited

U.S. PATENT DOCUMENTS

| | | | | | |
|---|---|---|---|---|---|
| 4,497,410 | A | * | 2/1985 | Coate | 483/61 |
| 4,512,068 | A | | 4/1985 | Piotrowski | |
| 4,571,814 | A | | 2/1986 | Palfery et al. | |
| 4,645,391 | A | | 2/1987 | Fallert | |
| 4,664,366 | A | | 5/1987 | Lane et al. | |
| 4,678,894 | A | * | 7/1987 | Shafer | 235/375 |
| 4,834,595 | A | | 5/1989 | Cacciotti | |
| D319,414 | S | | 8/1991 | Moore | |
| 5,064,321 | A | | 11/1991 | Barnes | |
| 5,065,991 | A | | 11/1991 | Schneider | |
| 5,083,485 | A | * | 1/1992 | Link et al. | 82/124 |
| 5,116,174 | A | | 5/1992 | Fried et al. | |
| 5,139,246 | A | | 8/1992 | Yakou | |
| 5,429,393 | A | | 7/1995 | Parlo | |
| 5,429,461 | A | | 7/1995 | Mukherjee et al. | |
| D362,689 | S | | 9/1995 | Goldman et al. | |
| 5,569,003 | A | | 10/1996 | Goldman et al. | |
| 5,647,704 | A | | 7/1997 | Turchan | |
| 5,653,038 | A | | 8/1997 | Hunter | |
| 5,718,422 | A | | 2/1998 | Morghen | |
| 5,897,275 | A | | 4/1999 | Sella | |
| 5,915,678 | A | | 6/1999 | Slocum et al. | |
| 6,059,495 | A | | 5/2000 | Mueller | |
| 6,085,126 | A | | 7/2000 | Mellgren, III et al. | |
| 6,105,949 | A | | 8/2000 | Morghen | |
| 6,186,711 | B1 | | 2/2001 | Mueller | |
| 6,286,823 | B1 | | 9/2001 | Morghen | |
| 6,321,430 | B1 | | 11/2001 | Goldman et al. | |
| 6,434,870 | B1 | | 8/2002 | Fanjoy | |
| 6,478,515 | B1 | | 11/2002 | Mueller | |
| D474,128 | S | | 5/2003 | Bonnet | |
| 6,668,210 | B1 | | 12/2003 | Kim et al. | |
| 6,817,814 | B2 | | 11/2004 | Mueller | |
| 6,826,820 | B2 | | 12/2004 | Denham et al. | |
| 6,869,069 | B1 | | 3/2005 | Azvedo et al. | |
| D507,201 | S | | 7/2005 | Lathrop | |
| 6,943,314 | B2 | | 9/2005 | Kosted | |
| 6,976,814 | B2 | | 12/2005 | Newman | |
| 7,108,462 | B2 | | 9/2006 | Newman | |
| 7,290,978 | B2 | | 11/2007 | Tran | |
| 2002/0066378 | A1 | | 6/2002 | Almblad et al. | |
| 2002/0088809 | A1 | | 7/2002 | Huynh | |
| 2004/0164450 | A1 | * | 8/2004 | Mathew et al. | 264/255 |
| 2006/0039769 | A1 | | 2/2006 | Newman | |
| 2006/0213048 | A1 | * | 9/2006 | Kalanovic | 29/468 |
| 2006/0293784 | A1 | * | 12/2006 | Braunstein | 700/231 |
| 2007/0060022 | A1 | * | 3/2007 | Wirz et al. | 451/5 |
| 2007/0114720 | A1 | * | 5/2007 | Ibach | 273/260 |
| 2007/0162183 | A1 | * | 7/2007 | Pinney et al. | 700/236 |
| 2008/0040911 | A1 | * | 2/2008 | De Koning | 29/592 |
| 2008/0173067 | A1 | * | 7/2008 | Farina et al. | 73/1.16 |
| 2008/0182224 | A1 | | 7/2008 | Aheam | |
| 2009/0044401 | A1 | | 2/2009 | Maenishi | |
| 2010/0028117 | A1 | * | 2/2010 | Nihei et al. | 414/728 |
| 2012/0004771 | A1 | * | 1/2012 | Walker et al. | 700/236 |

* cited by examiner

PUBLIC USE PET TAG MARKING KIOSK

CROSS REFERENCE TO RELATED APPLICATIONS

This application is a continuation of U.S. patent application Ser. No. 12/115,346 to Hagen et al. entitled "Public Use Pet Tag Marking Kiosk," currently pending, which was filed on May 5, 2008, the disclosure of which is hereby incorporated herein by reference, which application claims the benefit of the filing date of U.S. Provisional Patent Application 60/915,739 to Hagen et al. entitled "Pet Tag Marking kiosk," which was filed on May 3, 2007, the disclosure of which is hereby incorporated herein by reference.

BACKGROUND

1. Technical Field

Aspects of this document relate generally to public use kiosks for marking pet tags.

2. Background Art

Conventionally, pet tag marking kiosks are of four types: stamping, imprinting, stylus engraving and laser etching. Each type uses a different type of marking implement to mark a text message or logo or other image (collectively "image") on a pet tag. Conventional pet tags used in marking kiosks designed for pet tags are flat to not interfere with the marking machinery during the marking process.

Marking machines and kiosks come in various shapes and sizes. Some kiosks are designed as public use kiosks. In a public use kiosk, a customer is permitted to approach and operate the kiosk to customize the marking of a particular tag selection from inside the kiosk and cause the machine to mark a pet tag, but the customer cannot manually access the marking implement. An example of a public use kiosk pet tag marking machine is shown and described in U.S. Pat. No. 5,569,003 to Goldman et al. In operation of the public use product relating to this patent, which is distributed by The Hillman Group of Tempe, Ariz. and at the time this application was filed was found in many PetSmart and WalMart stores, the operator inserts a token, purchased from the store, selects a desired pet tag within the kiosk from the touch screen, enters the desired text message for the tag, and starts the system. The system stores several different shapes of flat, anodized aluminum inventory tags in columns that dispense to tag carriers that move to etching positions. A diamond tipped engraving stylus scratches the text onto the top surface of the anodized aluminum tag and then dispenses the etched tag to a tag dispensing tray.

Other known smaller pet tag marking machines which are not kiosks allow a trained store employee to place a flat pet tag in a holder within a small desktop engraving machine. The store employee has access to the marking implement and places the pet tag directly below the marking implement in a tag tray. The store employee then enters the text to engrave on the pet tag and causes the engraving machine to engrave the top surface of the pet tag. Such a system is distributed by The Hillman Group of Tempe, Ariz. under the product names VetScribe and PetScribe. In U.S. Pat. No. 6,943,314 to Kosted, Kosted describes a method whereby a Veterinarian marks a first side of a rabies tag with rabies vaccination information, manually turns the tag over, and then marks the second side of the rabies tag with personal information separately.

Another desktop pet tag marking kiosk to Newman (disclosed in U.S. Pat. No. 6,976,814) discloses a pet tag marking kiosk that includes hexagonal, round, oval square or triangular placement pins on the work surface to keep a pet tag from twisting left or right on the work surface.

SUMMARY

Aspects associated with particular implementations of a tag marking kiosk comprise, among others, automatically marking two sides of a tag within the kiosk, receiving the tag to be marked from the customer, providing a closeable door between the marking implement and the customer while the tag is being marked, ejecting the tag from a tag holder after the tag is marked, and aligning the tag so that a desired tag side is required to be initially facing up on the tag holder. Housing for the kiosk may surround all of the system parts or may be split into a housing shell and a marking unit that fits inside the shell. Marking implements may be laser, mechanical stylus, paint, or others. Tags may be suspended in a cantilevered manner during marking. Not all implementations require every aspect of every implementation, and many implementations may only use one or more of the beneficial features and aspects.

In a first particular implementation, a public use tag marking kiosk comprises a housing, a tag receiver on the housing and accessible to a customer from outside the housing, a marking implement enclosed within the housing such that the customer cannot access the marking implement from outside the housing, a tag holder within the housing and configured to extend in response to instructions received from the controller, securely receive a tag from the customer from outside the housing through the tag receiver and retract with the tag to a marking position within the housing, and a graphical user interface configured to prompt a customer to supply information about an image to mark on a tag and to place the tag in the tag holder.

In a second particular implementation, a public use tag marking kiosk comprises a housing, a tag return on the housing and accessible to the customer from outside the housing, a graphical user interface configured to prompt the customer to supply information about an image to mark on a tag, a marking implement enclosed within the housing such that the customer cannot access the marking implement from outside the housing, and a tag holder within the housing, the tag holder configured to position a tag within the tag holder in a first marking position in relation to the marking implement to mark a first side of the tag and automatically reposition the tag within the tag holder to a second marking position in relation to the marking implement to mark a second side of the tag different from the first side, the tag holder further configured to automatically dispense the tag to the tag return after the tag is marked by the marking implement.

In a third particular implementation, a public use tag marking kiosk comprises a housing comprising a self-supporting housing shell comprising a tag receiver and a tag return accessible from outside the housing, and a first viewing window through the shell, and a marking unit sized to fit within the housing shell and removably coupled to the housing shell. The marking unit comprises a marking implement enclosed within the housing and inaccessible from outside the housing shell when the marking unit is coupled to the housing shell, a graphical user interface coupled to the housing and configured to prompt a customer to supply information about an image to mark on a tag. A second viewing window is included adjacent the marking implement and at least partially aligned with the first viewing window so that the marking implement is visable to a customer through the first and second windows when the customer is facing the tag receiver. The marking unit comprises a tag holder in the marking unit which is extendable from a first position within the marking unit to a second position at the tag receiver of the housing shell.

One or more of the following aspects and features may be included with one or all implementations of a public use tag marking kiosk. A tag marking kiosk may comprise a tag holder comprising an alignment feature sized and shaped to mate with an alignment feature associated with a tag, wherein the tag holder alignment feature is configured to accept placement of the tag in the tag holder with only a first side facing up and reject placement of the tag with any other than the first side facing up. A tag marking kiosk may comprise a tag holder comprising a receiving pin having an alignment feature extending from a side thereof, the receiving pin and alignment feature combination comprising a cross-sectional shape that is asymmetrical for all cross sections of the shape when the alignment feature extends at a vertical angle with respect to the receiving pin, and is asymmetrical for all but not more than two cross sections of the shape when the alignment feature extends at a non-vertical angle with respect to the receiving pin. In particular implementations of a tag marking kiosk with a receiving pin with an alignment feature, the tag holder may comprise a clamp with a protrusion having a recess sized and shaped to receive the shape of the receiving pin and alignment feature such that when the clamp clamps down on the tag in the tag holder, the protrusion presses against a surface of a pet tag near its collar ring hole. In particular implementations, the protrusion may be made retractable toward the clamp and spring biased away from the clamp to adapt to varying tag thickness.

A tag marking kiosk may comprise a tag holder coupled to an automated arm extendable from a first position within the housing to a second position at the tag receiver such that the tag holder receives a tag from the customer through the tag receiver.

A tag marking kiosk may comprise a tag holder with a clamp, wherein the tag holder is configured to rotate from a first marking position in which a first side of the tag is marked to a second marking position in which a second side of the tag is marked. In particular implementations, the tag holder may be configured to suspend the tag in a cantilevered manner while marking the tag. The clamp may clamp the tag and suspend the tag in a cantilevered manner from a portion of a tag adjacent to a collar ring hole of the tag. In particular implementations, the tag holder may comprise a receiving pin at a first end and a support extending from the first end to a second end of the tag holder, wherein the first end and the second end of the tag holder are substantially planar with each other.

A tag marking kiosk may comprise a tag receiver through which the tag holder receives the tag that is vertically above a tag return through which the customer retrieves a marked tag. A passage may extend between the tag receiver and the tag return, and the tag holder may comprise an opening large enough to pass the tag into the passage such that if the customer misaligns a tag when placing it in the tag holder, the tag falls by gravity through the tag holder into the passage and into the tag return.

Marking implements for a tag marking kiosk may comprise a laser or a mechanical stylus or a paint applicator or other marking implement.

A tag marking kiosk may comprise a tag ejector. In particular implementations, a tag holder may comprise a receiving pin on which an unmarked tag is placed by the customer and a tag support moveably coupled to the receiving pin and configured to eject the tag from the receiving pin to a tag return after the tag is marked.

A tag marking kiosk may comprise a closeable door on the housing between the marking implement and the customer. In particular implementations, the controller is configured to stop operation of the marking implement unless the door is closed.

Although there are no limits specific limits on how a marking kiosk may be used, in one particular implementation, a method of marking a tag at a public use tag marking kiosk comprises enclosing a marking implement within a kiosk housing such that a customer cannot access the marking implement from outside the housing, receiving a tag from the customer outside the kiosk through a tag receiver on the kiosk housing, moving the tag from the tag receiver to a marking position adjacent the marking implement; closing a door on the kiosk housing between the customer and the tag after receiving the tag from the customer, marking the tag with the marking implement within the kiosk housing, and returning the tag to the customer after marking the tag.

In another particular implementation, a method of marking a tag at a public use tag marking kiosk comprises enclosing a marking implement within a kiosk housing such that a customer cannot access the marking implement from outside the housing, gripping a tag to be marked and moving the tag to a marking position adjacent the marking implement, automatically marking a first side of the tag with the marking implement responsive to a controller, automatically marking a second side of the tag, opposite the first side, with the marking implement responsive to the controller, and dispensing the tag to the customer after automatically marking both sides of the tag.

One or more of the following aspects and features may be included with one or all implementations of a method of marking a pet tag through a public use tag marking kiosk. A method may comprise receiving the tag from the customer with a first tag side up such that the tag will not fit on a tag holder if the first tag side is not facing up. Marking a tag may be done with a mechanical stylus, a laser, paint spray, or other marking implement.

A method may comprise marking a first side of the tag and automatically marking a second side of the tag, opposite the first side, before returning the tag to the customer. In particular implementations, receiving the tag from the customer comprises gripping the tag at the tag receiver with a clamp and automatically moving the tag into the kiosk from the tag receiver with a tag holder. In particular implementations, marking a first side and a second side of the tag before returning the tag to the customer comprises axially rotating the tag 180 degrees between marking the first side and the second side.

A method may comprise ejecting the tag from a tag holder to a tag return after marking the tag. A method may comprise physically requiring the customer to place the tag on a tag holder with a first side facing up and rejecting the tag with the tag holder if the first side is not facing up.

A method may comprise receiving the tag from the customer through a tag receiver in the housing prior to gripping the tag. In particular implementations, receiving the tag comprises gripping the tag at the tag receiver with a clamp and automatically moving the tag into the kiosk from the tag receiver with a tag holder. In particular implementations, marking the first side and the second side of the tag before returning the tag to the customer comprises axially rotating the tag 180 degrees between marking the first side and the second side.

A method may comprise gripping the tag from an end such that the tag is suspended in a cantilevered manner while being marked with the laser. A method may comprise ejecting the tag from a tag holder to a tag return after automatically marking the second side of the tag.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and.

DESCRIPTION

Figure 1:
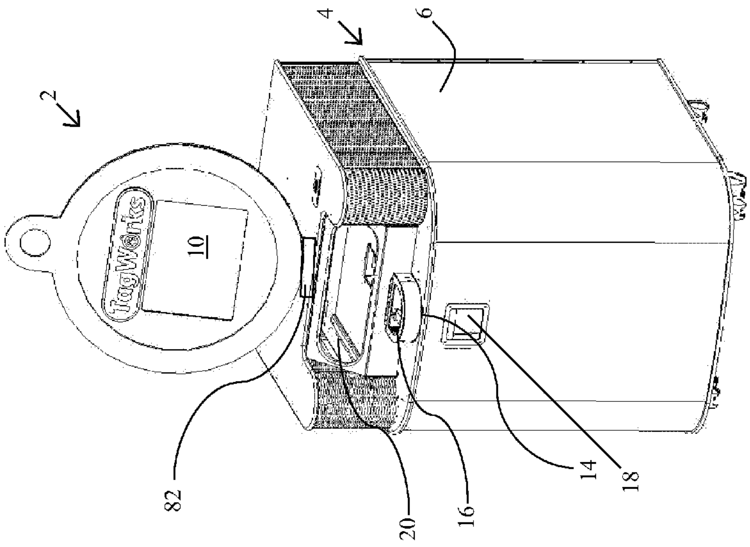
FIG. 1 illustrates a perspective front view of a pet tag marking kiosk configured according to a particular implementation.

This disclosure, its aspects and implementations, are not limited to the specific components or assembly procedures disclosed herein. Many additional components and assembly procedures known in the art consistent with the intended pet tag marking kiosks and/or assembly procedures for pet tag marking kiosks will become apparent from this disclosure. Accordingly, for example, although particular pet tag marking kiosks are disclosed, such systems and implementing components may comprise any shape, size, style, type, model, version, measurement, concentration, material, quantity, and/or the like as is known in the art for such systems and implementing components, consistent with the intended operation of pet tag marking kiosks.

Tag marking kiosks specifically described in this disclosure and which will become apparent from the explanation provided in this disclosure may include one or more of the various aspects relating to tag marking kiosks discussed herein. The various aspects may be taken together or separately for various combinations and sub-combinations of aspects and system components to assemble a tag marking kiosk having any number of configurations depending upon the ultimate use of the system, features included and cost of the system desired. Those of ordinary skill in the art will readily be able to assemble a system once the principles discussed and combinations explained are understood.

As used herein, the term "marking kiosk" refers to the type of marking kiosk wherein a customer does not have access to the marking implement and, therefore, can safely use the kiosk without risk of becoming injured by the marking implement.

A first aspect of a tag marking kiosk relates to an overall system layout. Although particular configurations may be shown in the related Figures, other configurations are also contemplated and described throughout this disclosure. Each of the configurations described here includes: a user interface to a tag marking kiosk and a tag marking implement. Additional optional components included in these particular configurations include: a payment receiver, a tag clamp, a tag holder, tag storage, alignment features, and other optional elements.

A control system for a tag marking kiosk may be configured with software and/or hardware configured to provide self diagnostics for the system as well as reporting modes that allow for direct wired or wireless reporting to a central computer through the Internet or other appropriately configured local area or wide area network (LAN or WAN). Alternatively, reporting and/or data collection may be done by any other method known in the art for sales and inventory tracking.

Whether through an existing internal connection or through a periodic connection through an external computer connection such a USB port, particular implementations of a tag marking kiosk may comprise an external connection to allow memory stick upgrade of the system controls and touch screen interface by store manager when new tags are added to the line or other software or system updates are desired. Automatic updating through the existing connection, if included, is also contemplated. Other particular implementations may also comprise external video connections through which a point of purchase display may be regularly updated and show still and/or moving images for marketing. Yet other particular implementations may comprise a security camera to monitor system use and abuse, and store and/or send those images to the system owner or store management.

A tag marking kiosk may also be configured to include training for the consumer and/or for the technician or store worker. For example, a video explanation of how the system works, for marketing and/or for step-by-step explanation while the consumer is marking a tag, may be programmed into the control system and user interface. Additional tutorials and explanations may be programmed in for a service technician, a store manager or other person interfacing with the system to simplify its use. For example, an explanation of how to run diagnostics for the system, how to change an air filter, and/or how to swap out modular level components like the touch screen interface, laser, marketing display and tag marking table may be included.

Figure 2:
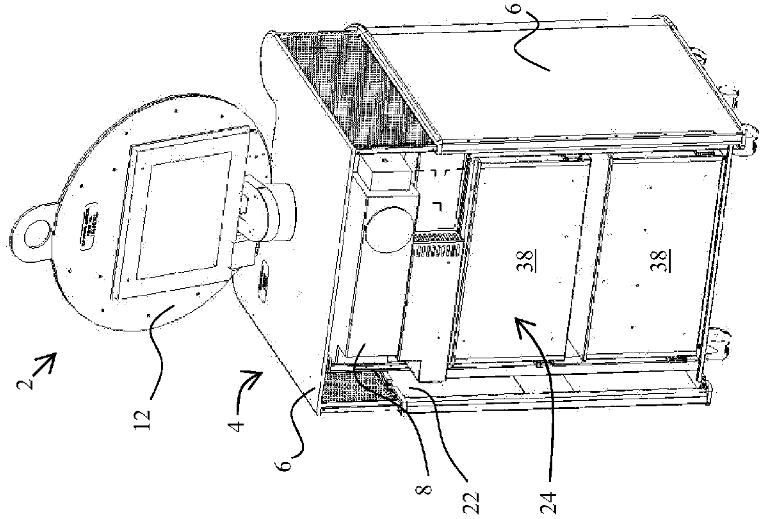
FIG. 2 illustrates a perspective rear view of the pet tag marking kiosk of FIG. 1.

FIGS. 1 and 2 illustrate, respectively, perspective front and rear views of a tag marking kiosk 2 specifically configured according to a particular implementation as a pet tag marking kiosk 2. The pet tag marking kiosk 2 comprises a housing 4 comprising a housing shell 6 and a marking unit housing 8. A touch screen display 10 is operatively associated with a system controller 12 conveniently located, in this particular implementation, behind the display 10. The housing shell 6 of the housing 4 comprises a tag receiver 14 with a door 16, a tag return 18, and a viewing window 20. The housing shell 6 comprises an opening 22 in its rear side (see FIG. 2) which may or may not be enclosed with a door or panel (not shown for convenience in FIG. 2). The opening 22 is sized and shaped to receive a marking unit 24 (see also FIG. 4) within the housing shell 6. The controller may be configured to stop operation of the marking implement unless the door 16 is closed.

In particular implementations of a pet marking kiosk housing, the housing shell may comprise one or more shelves on which the marking unit and other related components may be placed within the shell so that the marking unit and housing shell may be manufactured separately and then assembled. In many ways implementations, the marking unit may be configured complete for marking on its own if coupled with a controller so that it need only be coupled to the housing shell to operate as a public use kiosk. In some particular implementations, the marking unit may be coupled to the housing shell through rails to facilitate easily sliding the marking unit into and out of the housing shell. In still other particular implementations, the front side of the housing shell may open to allow the marking unit to be placed into the housing shell from the front side (similar to an engine under the hood of a car).

Figure 3A:
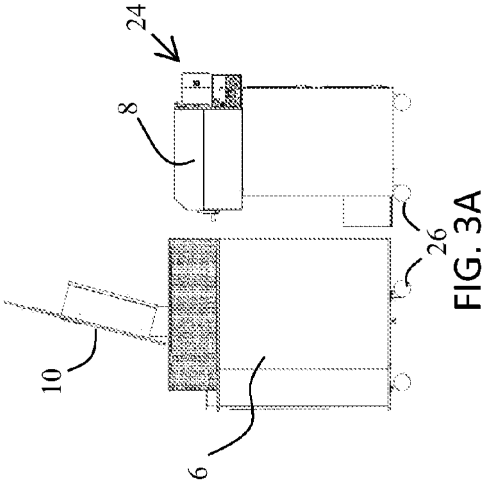
FIGS. 3A and 3B illustrate side views of a particular implementation of a tag marking kiosk.
Figure 3B:
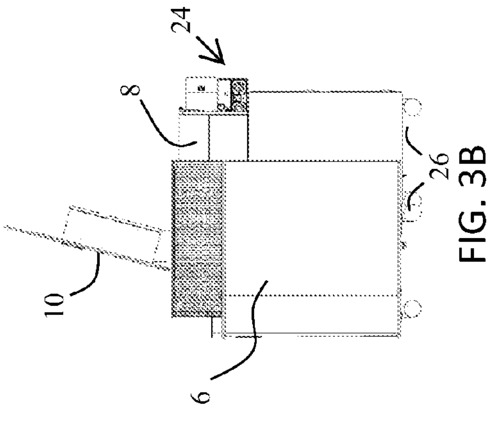
Figure 5B:
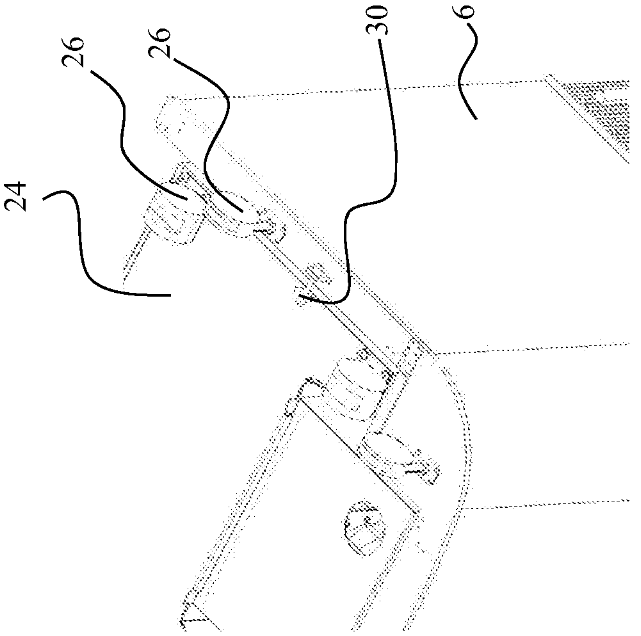
FIG. 5B illustrates a bottom perspective view of a particular implementation of a tag marking kiosk.
Figure 5A:
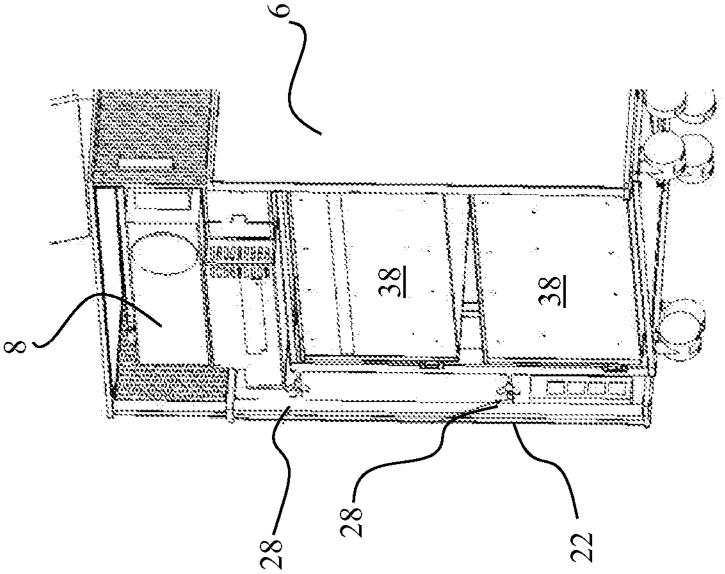
FIG. 5A illustrates a rear perspective view of a particular implementation of a tag marking kiosk.

As illustrated in the specific example provided in FIGS. 3A and 3B, the housing shell 6 may be self-supporting, meaning that it can stand on its own without the marking unit 24. In this particular example, the marking unit 24 is also self-supporting. Both the housing shell 6 and the marking unit 24 in this particular example are supported on casters 26 and the marking unit 24 may be rolled into the housing shell 6. With reference to FIGS. 5A and 5B, once the marking unit 24 is rolled into the housing shell 6, the marking unit 24 and housing shell 6 are removably, but fixedly coupled together with threaded couplings 28 near the opening 22 and the rear side of the marking unit 24, and couplings 30 on the bottom side of both the marking unit 24 and housing shell 6. Once the couplings 28 and 30 are coupled, the marking unit 24 and housing shell 6 do not move relative to each other, but are coupled as if a common unit.

Of course, in other implementations the marking kiosk 2 may be configured as a combined unit without separable components. One benefit of having separate units that can be assembled is that different marking units may be alternatively used with the same housing shell. For example, if a marking unit malfunctions and needs to be replaced, the malfunctioning marking unit may be easily removed and a replacement marking unit may be substituted into the same housing shell without excessive down time for the machine. As another example, during initial manufacture and delivery, if a particular location desires a laser marking kiosk, a laser marking unit may be installed into the housing shell, but if the particular location desires a mechanical stylus marking kiosk, a mechanical stylus marking unit may be installed into the same housing shell. This versatility is particularly useful in an industry where there are a variety of marking needs and preferences. Laser marking implements are capable of much finer and detailed fonts and image engraving, are much faster than mechanical stylus and have the appeal of new technology. Mechanical stylus marking implements are much less expensive than lasers. Particular situations may only justify use of a mechanical stylus marking implement where others will justify the cost of a laser marking implement.

Figure 4:
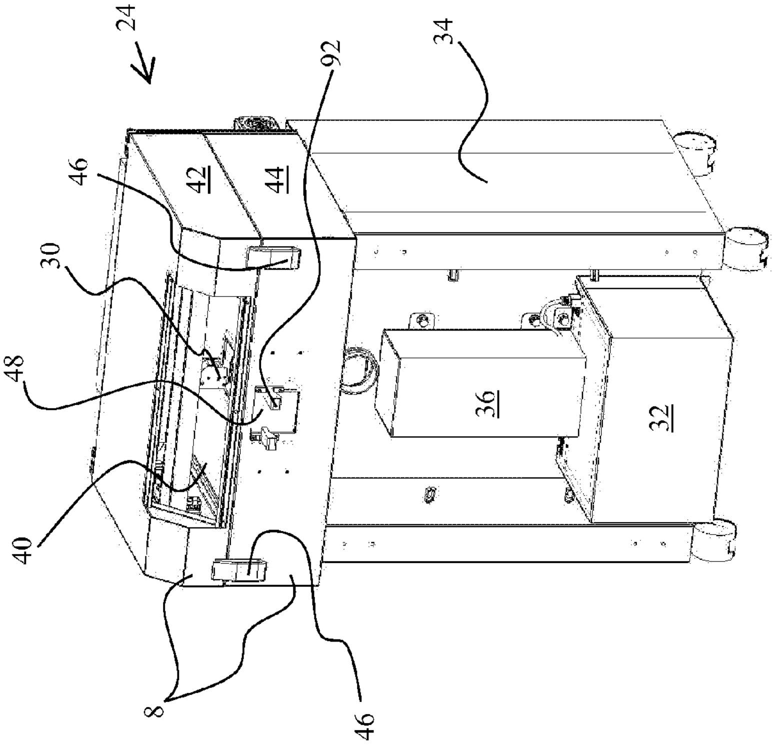
FIG. 4 illustrates a perspective front view of a particular implementation of a tag marking kiosk marking unit.

With reference to FIG. 4, the marking unit 24 primarily comprises a marking unit housing 8 that houses a marking implement 30, a power supply 32, or transformer, and a support 34. Particular implementations also comprise a vacuum source 36. The support 34 may optionally comprise one or more storage compartments 38 (FIG. 2) in which product inventory, marking unit components, an air filter, or other materials may be stored. The storage compartments in the implementation of FIG. 2 are configured as drawers. The marking unit housing 8 comprises a viewing window 40 that at least partially aligns with the viewing window 20 on the housing shell 4. It should be noted that a protective window, such as a glass or plastic plate, is not required in both the housing shell viewing window 20 and the marking unit viewing window 40. In most implementations, it is contemplated that the housing shell viewing window 20 will simply be a portal viewing window 20 that opens through the housing shell 4 to allow the customer to view through the marking unit viewing window 40 at the marking implement 30. In this particular implementation, the marking unit housing 8 comprises upper and lower housing members 42 and 44 pivotally coupled together and latched with latches 46 on the front side. When the marking unit 24 is coupled into the housing shell 6, a customer will not be able to access the marking implement 30 within the marking unit 24 because the marking unit housing latches 46 are inaccessible to the customer without disassembling the kiosk 2. Making the kiosk closed to the customer (without disassembly tools, or a key to open a lock) so that the marking implement 30 is inaccessible to the customer adds a degree of safety in using the kiosk so that it can be used as a public use marking kiosk. In marking machines where a user, such as a technician, has access to the marking implement, specialized safety training is needed for the technician to safely operate the marking machine.

In addition to the viewing window 40 on the front side of the marking unit housing 8, in this particular implementation a door 48 is placed between the marking implement and the tag receiver 14 (FIG. 1) when the marking unit housing 8 is coupled to the housing shell 6. The door 48 closes the marking unit housing 8 when the marking implement is in operation, but is configured to open to permit the marking kiosk to receive components to mark, such as pet tags, from a customer. The door 48 may be configured to stop operation of the marking implement 30 unless the door 48 is closed.

In the specific implementations shown in FIGS. 1-5B, the marking implement 30 is a laser marking implement. Lasers come in a variety of frequencies, power levels, and abilities. The frequency and power level used often determines the laser's abilities. For marking anodized aluminum, for example as may be used with a pet tag, a 10-15 W laser is sufficient, though larger power lasers may be used. For cutting plastics or even metals, however, stronger power lasers may be needed. The components associated with the various lasers to operate the lasers are many, and include such components as a laser tube, a filter, a controller, a power supply and possibly a vacuum. Those of ordinary skill in the art of laser marking will readily be able to select an appropriate laser and related components for the intended purpose of the laser, and particularly for marking various types of materials. Lasers and associated filters and other laser system components used for many purposes are available from many different companies including Gravograph, Inc. of Georgia, Universal Laser Systems, Inc. of Arizona and Epilog Laser of Colorado.

For a CO2 laser, all or a portion of the protective cover around the laser may be made of or include a protective film of pigmented acrylic or polycarbonate. Protective covers of other materials, such as metals, may be used as appropriate for particular laser types and intensities. Those of ordinary skill in the art will be aware of the safety ratings and materials appropriate for given laser usage to reduce the viewable laser light through the window to a safe level. Several factors to be considered in selecting an appropriate material or film for the window is the laser absorption type, its frequency and power, its attenuation and the position of the laser with respect to the customer.

In the specific implementations shown in the various figures, the kiosk is configured to receive a tag from a customer through a tag receiver, mark the tag and dispense the tag back to the customer. However, it is anticipated that not all implementations will involve the kiosk receiving a tag from the customer. In many implementations, the kiosk may house and dispense tags for marking from inside the kiosk housing 4. U.S. Pat. No. 5,569,003 to Goldman et al., the disclosure of which is hereby incorporated herein by reference for its relevance as a system that stores tags within the kiosk and marks and dispenses them to a marking implement, has long been the standard for pet tag marking kiosks despite its limited applications. The principles and aspects of the present disclosure may be modified by the teachings of Goldman et al. to generate a public use kiosk that stores and disperses tags within the marking kiosk in particular implementations.

The customer may receive the tag from a display in a store, or some other way, and may make payment for the tag and the tag marking at a register in the store. Alternatively, the customer may pay for the tag and/or the marking directly at the kiosk if the kiosk is modified to include methods of accepting payment such as by credit card or cash or tokens. Those of ordinary skill in the art will readily understand how to modify a kiosk to accept payment at the kiosk.

In a public use marking kiosk 2 such as that illustrated in FIGS. 1-6, for safety a closed door may be included between the customer and the marking implement when the marking implement is marking a tag. Particularly where a laser marking implement 30 is used, inclusion of a closeable door provides an additional safety feature to avoid a potentially dangerous laser beam from reflecting out of the marking kiosk to a customer. Although the risk is low and the laser power used in typical tag marking implementations would be low, such an additional feature may be included. Even for implementations where a different type of marking implement, such as a mechanical stylus (like a diamond tipped stylus), or a paint spray marking implement, having a closeable door between the customer and the marking implement is desirable if for no other reason than to further restrict access to the marking implement from outside of the kiosk.

Figure 6B:
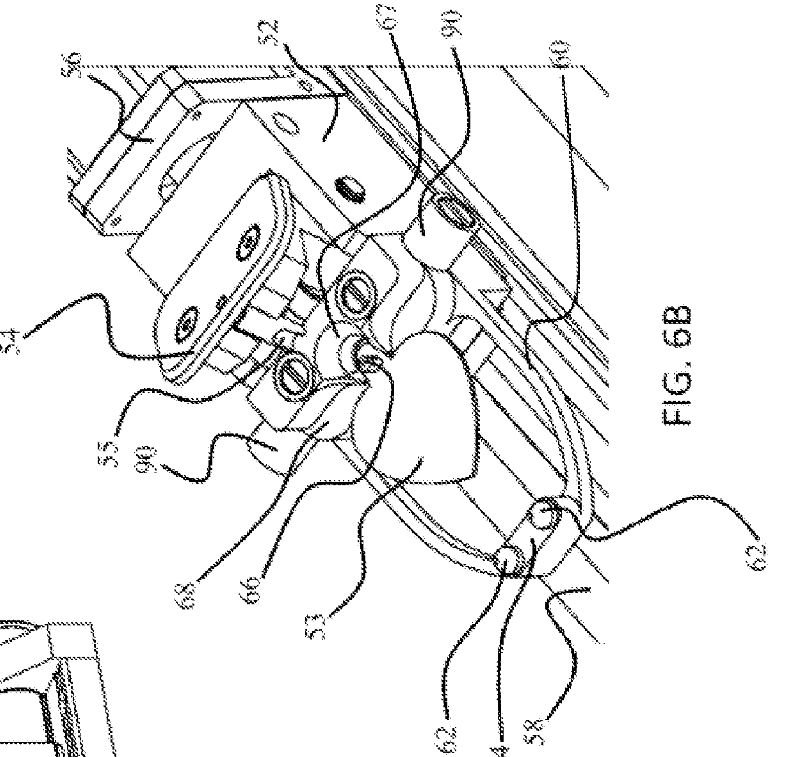
FIGS. 6A and 6B illustrate views of a particular implementation of a tag holder assembly.
Figure 6A:
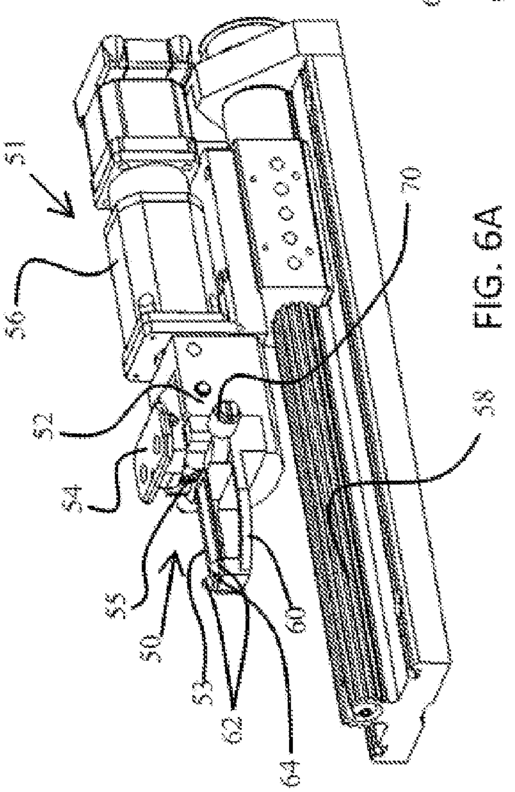
Figure 7:
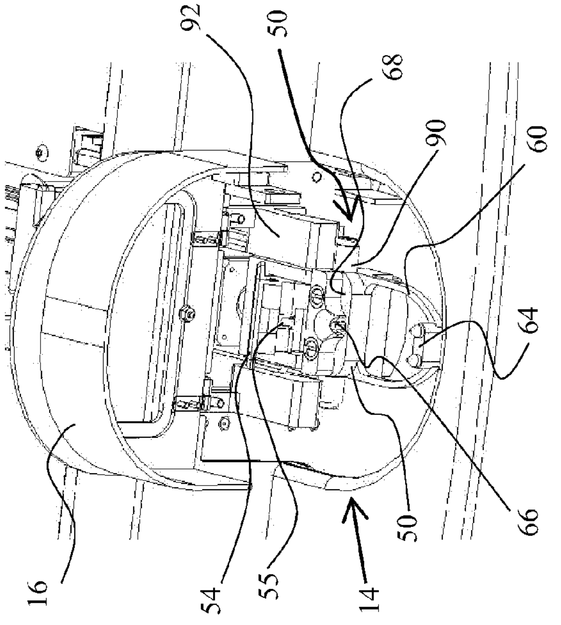
FIG. 7 illustrates a view of a particular implementation of a tag holder.

FIGS. 6A and 6B illustrate, respectively, a view and a close-up view of a particular implementation of a tag holder 50 and tag holder arm 52 with a clamp 54. Although the particular tag holder 50 implementation shown in FIGS. 6A and 6B is illustrated with particular features and abilities, it should be understood that simpler and more complex implementations are also contemplated. For example, particular tag holder implementations may involve a tray or carrier sized and shaped to receive a particular tag shape. In other particular implementations, the trays or carriers for the tag holder may be interchangeable depending upon the shape and size of the tag to be marked. For the implementation of FIG. 6A, the tag holder assembly 51 is in a retracted position. The tag holder assembly 51 is installed into a marking unit 24 (see FIG. 4, for example) so that a tag 53 carried by the tag holder 50 can be retracted to a point below the marking implement in the marking unit 24 and be marked. A gear head 56 may be included in particular implementations configured for two-sided marking, and the controller for the system may be configured to signal the gear head 50 to cause the tag holder arm 52 to rotate from a first marking position axially 180 degrees to a second marking position mark a second side of the tag 53 after a first side is marked. In such implementations, though it is not required for implementations where only one side is marked, a clamp 54 may be included on the tag holder 50. A particular implementation of a tag holder 50 comprising a clamp 54 is illustrated in FIGS. 6A to 7. The clamp 54 comprises a protrusion 55 with a recess sized and shaped to receive at least a portion of the shape of a receiving pin 66 and any alignment feature that may be included on the receiving pin 66 such that when the clamp clamps down on the tag 53 in the tag holder 50, the protrusion 55 presses against the surface of the tag 53 near its collar ring hole. In particular implementations, the protrusion 55 is spring biased to adapt to differing thicknesses of pet tags and still press firmly against the tag 53. A coil spring or bar spring mounted above the protrusion 55 within the clamp 54 is sufficient to accomplish this so that the protrusion 55 recedes into the clamp 54 a sufficient amount when the clamp 54 closes upon a thicker tag 53.

The tag holder assembly 51 comprises a track 58 upon which the tag holder arm 52 and related components are mounted. The track 58 permits the tag holder arm 52 to travel forward and backward on the track 58. For particular implementations, like that shown in FIG. 1 where the tag holder 50 is configured to receive a tag from a customer through a tag receiver 14, the controller operatively associated with the tag holder assembly 51 signals the tag holder assembly 51 and causes the tag holder 50 to move from a retracted position (FIG. 6A) for marking a tag 53 to an extended position (FIG. 7) for receiving a tag 53 from a customer and returning the tag 53 to the customer after marking.

In the particular implementation illustrated in FIGS. 6A and 6B, the tag holder 50 further comprises a support 60 extending from a first end to a second end of the tag 53. For implementations where mechanical stylus is used as the marking implement or even with other implementations when a tag is particularly long (such as in FIG. 6B), the support 60 assists in maintaining the tag 53 straight and level with respect to the marking implement during marking of the tag 53. As further assistance, one or more guides 62 may be included on the distal end 64 of the support 60. In the particular implementation of FIGS. 6A and 6B, the support 60 comprises two supports extending around the marking area of the tag so as to not interfere with marking the tag. The distal end 64 of the support 60 and the tag support shelf 68 are substantially planar with each other. As can be seen best in FIG. 6B, where the tag is shorter than the tag 53 shown, the tag is suspended on the tag holder 50 in a cantilevered manner such that it is supported only on one end (the end at the receiving pin 66) and the other end is unsupported. Although it is not required, for the particular implementation of the tag holder 50 shown in FIGS. 6B, 7 and 8, the receiving pin 66 comprises a tapered tip and the surrounding holder surface 67 is sloped toward the receiving pin 66 to assist a customer in properly placing a tag on the receiving pin 66. FIG. 7 illustrates a close-up of a particular implementation of a tag receiver 14 with a particular implementation of a tag holder 50 in its extended position ready to receive a tag for marking.

One particular concern experienced when marking a pet tag in a tag holder with a mechanical stylus, which can also be a concern to a lesser degree with a laser, is the risk of tag yaw. With a laser system, the tag needs only to be initially placed straight and not jostled too much in movement, or clamped into position. For a mechanical stylus marking system, however, the pressures exerted on the tag by the mechanical stylus cause additional risk of the tag being moved during marking. Particular aspects of systems described herein address this concern. Support and alignment features are some of them. Additionally, tag packaging may be configured to provide additional support. In co-pending U.S. patent application Ser. No. 12/105,589 to George Lynn Hagen et al., filed Apr. 18, 2008 titled "Pet Tags", tag packaging is described that includes additional support structures around the tag in the way of tag packaging so that the tag is placed in the marking system in its holding bracket. The holding bracket engages with components on the tag holder to minimize undesired movement of the tag while it is being marked to ensure a quality marking process for the tag.

Figure 9A:
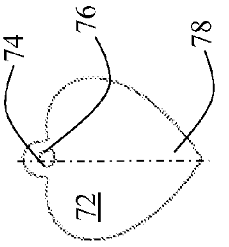
FIG. 9A illustrates a particular implementation of a pet tag with an alignment feature in the collar ring hole.
Figure 9B:
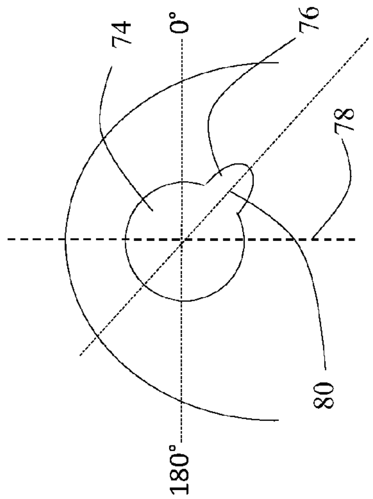
FIG. 9B illustrates a close-up view of a particular implementation of a collar ring hole and alignment feature of the pet tag of FIG. 9A.
Figure 8:
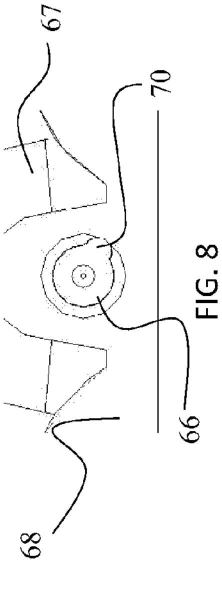
FIG. 8 illustrates a close-up top down view of a particular implementation of a receiving pin with an alignment feature.

FIG. 8 illustrates a close-up view of a particular implementation of a tag receiving pin 66 configured as an alignment pin with a pin alignment feature 70 extending from a side of the receiving pin 66. FIG. 9A illustrates a particular implementation of a pet tag 72 with a collar ring hole 74 with a tag alignment feature 76 extending from a side of the collar ring hole 74. FIG. 9B illustrates a close-up view of the collar ring hole 74 and tag alignment feature 76. In some implementations of tags, it is important that a particular side of the tag be facing up when it is placed on the tag holder. This may be because only a particular side of the tag can be marked, or a particular side of the tag is considered the front of the tag and should be marked appropriately, or for other reasons.

Rather than using more expensive optical or other sensors for determining whether the tag is placed right side up in the tag holder, implementations with a pin alignment feature 70 configured similar to that shown in FIG. 8 can simply ensure that a tag is always placed with the correct side up in the tag holder. The combined shape of the receiving pin 66 and the pin alignment feature 70 (and consequently the matching shape of the collar ring hole 74 and tag alignment feature 76 or other matching shape on the tag) comprise a cross-sectional shape that 1) is asymmetrical for all cross sections of the shape when the pin alignment feature 70 extends at a vertical angle with respect to the receiving pin 66; and 2) is asymmetrical for all but not more than two cross sections of the shape when the pin alignment feature 70 extends at a non-vertical angle with respect to the alignment pin 66.

As used herein and illustrated using the tag 72 of FIGS. 9A and 9B for illustrative example, a vertical angle means extending at substantially the 90 degree or 270 degree angle along the vertical axis 78 of the tag 72. As used herein, and illustrated using the tag 72 of FIG. 9B for illustrative example, a cross section of the shape may be taken along a line like cross section line 80 (where the two sides resulting from the cross section of the shape are symmetrical). For the cross section of the shape in FIG. 9B, there is only one symmetrical cross section for that shape. In particular implementations, like the implementation of FIG. 8 (again illustrated by the collar ring hole 74 and tag alignment feature 76 shape in FIG. 9B), the alignment feature 70 (76 on the tag 72) may extend at an angle between 0 degrees and 180 degrees. It has been found that tags 72 with tag alignment features 76 that extend below the horizontal line from the collar ring hole 74 tend to wear better and last longer. The alignment features may, of course, extend outward or inward on the shape.

The alignment feature on the tag may be included on a removable bracket coupled to the tag rather than directly on the tag itself. For example, a packaging bracket may be coupled to a tag that assists the tag's placement in the tag holder and assists in aligning a feature on the tag bracket with a mating alignment feature on the tag holder.

In addition to the collar ring hole shape assisting in knowing which side is up, other alternative or additional approaches may be taken. A determination of which side is facing up, for example, may be made in a marking kiosk through simple sensors, such as color, surface reflectance, magnetism, conductive properties, mechanical sensors, and other sensors, or through more complex sensors using machine vision such as cameras. Alignment features on a tag may be used independently of, in combination with, or may be replaced with features that cooperate with such sensors in a marking kiosk to determine which side of a tag is up prior to marking the tag.

In particular implementations, a recess may be included in a surface or edge of a tag that provides a mechanical reference point or grasping point for a portion of the system to confirm that a particular side of the tag is facing up. Particular examples of suitable tags are disclosed and discussed in co-pending utility application titled "Pet Tags" to George Lynn Hagen et al., filed Apr. 18, 2008 (application Ser. No. 12/105,589) the disclosure of which is hereby incorporated by reference. Where a recess is used, the recess may also be used to identify the tag if, for example, the recess is shaped differently for different styles or designs of tags and a probe evaluated a characteristic of the recess unique to a particular style or design of tag.

Other particular implementations of an alignment feature on a tag that may be referenced by a portion of a marking kiosk to determine which side of a tag is facing up include other topographical features on the tag itself that are unique to a particular tag side. Such topographical features, such as a notch, a nub, a slot, a bulge or recess at a particular point on one side of the tag that is not on the opposing side of the tag, may also serve to confirm that a tag has a first side up. Although ideally a common feature on all designs of tags to be marked within a marking kiosk would be best, particular implementations may have different features at different locations that a particular system will check to confirm the correct tag side is up. Furthermore, although it may further complicate the marking kiosk, this disclosure contemplates a system that may have additional moving parts, such as one or more probes, that can test whether the correct tag side is placed facing up in a particular marking kiosk.

The raised edge feature of the tag may also, or alternatively, be used to determine which side of the tag is up by placing the raised edge into a groove or matching the raised edge with a feature on the marking kiosk. Alternatively, a recess in the marking table and/or tag receiving tray may be configured to match a portion of the tag or at least to match with one or more points on the tag to restrict the tag from rotating when placed on the directional pin.

More particular descriptions of the possible uses of various aspects of a tag marking kiosk and more detailed methods of how to use them are included throughout this disclosure. However, in general, a customer who desires to mark a tag at a tag marking kiosk, in no required order: makes payment, selects a tag style to mark, selects a marking style (e.g. text, image, one or two sides), inputs the text and/or image to display, causes the system to mark the tag, and retrieves the tag.

Figure 10B:
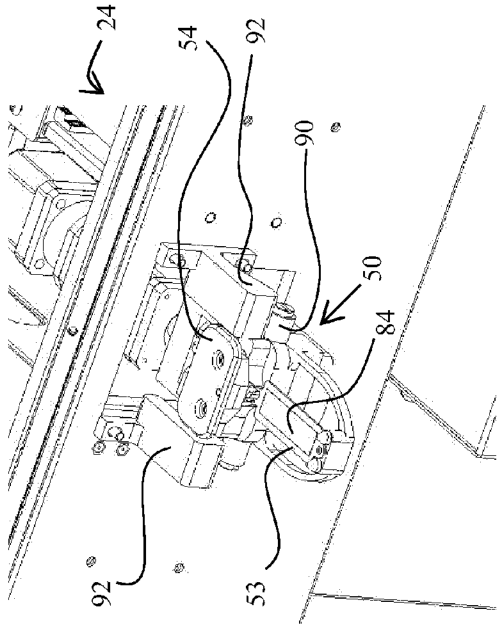
FIG. 10B illustrates a particular implementation of a tag holder with a tag on a receiving pin with the clamp closed.
Figure 10A:
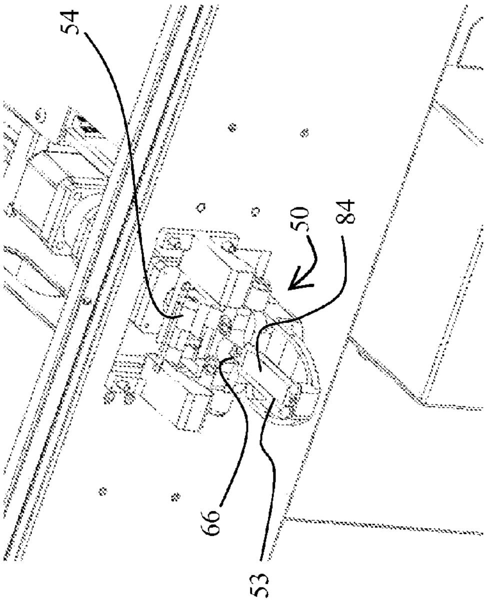
FIG. 10A illustrates a particular implementation of a tag holder with a tag on a receiving pin with the clamp open.
Figure 10C:
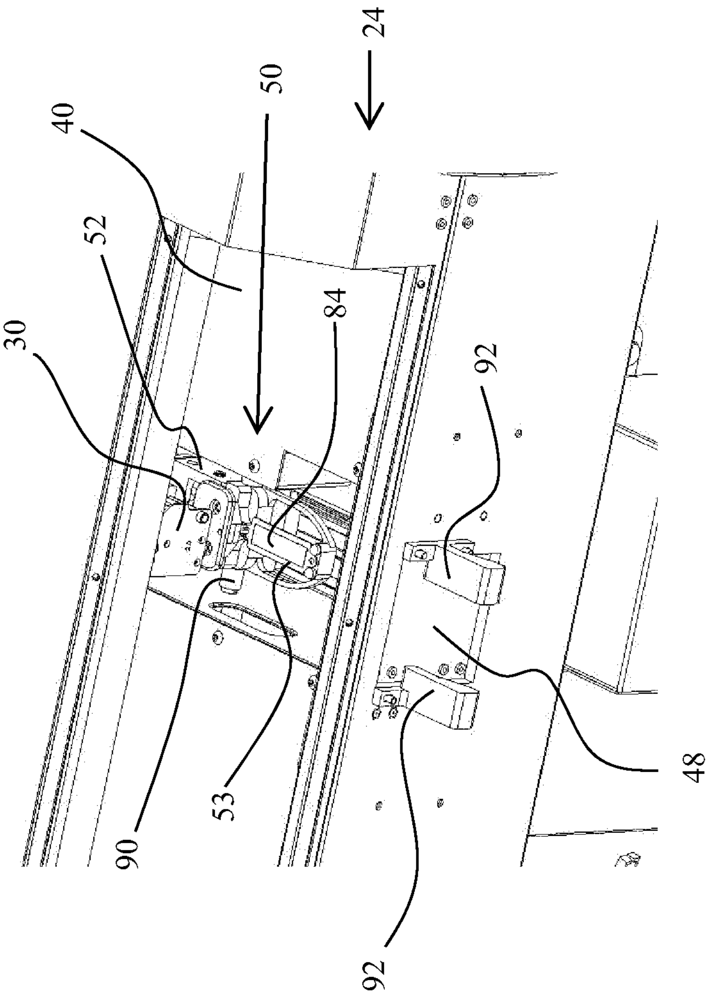
FIG. 10C illustrates a particular implementation of a tag marking kiosk marking unit with the tag holder in a retracted position.

FIGS. 10A to 11E illustrate examples of a particular implementation of a method of marking a tag placed in the marking kiosk by a customer by illustrating various tag holder positions with the housing shell 6 (FIG. 1) removed for clarity of view. Thus, the position of the tag holder 50 in FIG. 10A is the same as the position of the tag holder 50 in FIG. 7, but the housing shell 6 used in this particular implementation has been removed in FIG. 10A and a tag 53 is on the tag holder 50 in FIG. 10A.

When a customer approaches a public use kiosk 2 (FIG. 1) to mark a tag 53, the customer follows the graphical interface instructions on the graphical interface 10 and selects through the graphical interface 10 the image to print on the tag 53. That image may be actual pictures and/or logos, and/or may comprise lettering such as an address or identification information or other lettering. If the particular tag kiosk implementation is configured as a two sided marking tag kiosk and the tag 53 is printable on both sides of the tag, the customer can select images for both the front and the back of the tag 53. Based on the input the customer makes to the graphical interface 10, or through a keyboard if the graphical interface 10 is not a touch screen, a controller associated with the graphical interface 10, the marking implement 30 (FIG. 10C) and the tag holder assembly 51 generates signals to which the marking implement 30 and the tag holder assembly 51 respond to mark the tag. If there are more than one tag 53 available to the customer for printing, the customer may first indicate to the kiosk 2 the tag or tag style to be printed. This may be done, among other ways, by requiring the customer to enter a particular code in the kiosk 2 to indicate the tag either through the graphical interface 10 or through a scanner, such as a bar code scanner 82 mounted somewhere on the kiosk 2. The bar code scanner 82, for example, may be configured to recognize a bar code on the tag itself, the tag packaging or on the customer receipt that corresponds with a known tag style for the kiosk 2.

It is contemplated that in particular implementations without automatic marking of a second side of the tag, a tag may be passed back to a customer after the first side of the tag is marked and the customer may be asked to turn over the tag manually and return the tag to the system for marking the second side of the tag. In other particular implementations with automatic marking of a second side of the tag, multiple marking implements may be included within the system to sequentially or simultaneously mark both sides of the tag. For example, two laser marking implements or two mechanical stylus marking implements may be included within the marking unit and the tag may be moved to a marking position between the two marking implements and marked.

In a particular implementation, a tag marking kiosk activation code is generated by algorithm through a cash register system at a store. Additionally, the system may receive additional promotional codes or codes to unlock images or system capabilities not available to the general public, such as free two-sided marking, additional marking on the tag design or secondary markings. The tag marking kiosk, in some implementations, may be configured to produce a customer receipt or coupons. In other particular implementations, the system may be configured to receive a combination of button pushes or customer interactions that when done in a particular sequence activates additional system abilities or features not available to the general public. The customer may learn the existence of such a code or feature through the Internet, for example, or through a web site, Internet or other blog, television commercial or other marketing channels.

After the customer has indicated the image to be marked, the customer can indicate readiness to mark the tag 53. The tag holder 50, responsive to the controller, moves to its extended position at the tag receiver 14 (FIG. 7). The tag receiver door 16, which is closed during marking of a tag 53 and is, thus, between the customer and the marking implement 30 during marking of a tag 53, opens when the tag holder 50 nears its extended position. After the customer places the tag 53 on the receiving pin 66 with a first side 84 up due to the pin alignment feature 70 (FIG. 8) mating with a corresponding tag alignment feature 76 on a collar ring hole 74 of the tag 53 (72 in FIG. 9A), the customer is instructed to close the tag holder clamp 54 against the tag 53 (see FIG. 10B for closed position). The customer is then instructed to close the tag receiver door 16 (or the system may be configured to sense the clamp closure and automatically close the tag receiver door 16. If the kiosk 2 is not configured to close the tag receiver door 16 or automatically sense its closure, the customer then indicates to the kiosk 2 through the graphical interface 10 that the tag 53 is ready for marking. When the tag 53 is ready for marking, the tag holder 50, responsive to the controller, moves back to its retracted position (FIG. 10C) adjacent to the marking implement 30 and the first side 84 of the tag 53 is marked. The marking of the tag 53 may be viewed by the customer, in particular configurations, through a viewing window 40.

In particular implementations, the tag holder 50 may be mounted to the marking unit 24 and extend from a first position inside the marking unit to a second position outside the marking unit, like is illustrated in FIGS. 7 to 10. In other particular implementations, the tag holder 50 may be mounted elsewhere on the housing 4 outside of the marking unit 24 and extend from a first position inside the marking unit to a second position outside the marking unit.

In particular implementations where a separate housing shell 6 and marking unit 24 are used, an additional door 48 may be used on the marking unit 24 between the customer and the marking implement 30 during marking of the tag 53. This additional door 48 is not required for safety because the tag receiver door 16 is closed during marking and will prevent a customer's access to the marking implement 30 and prevent injury to the customer from the marking implement 30 during marking (e.g. even from a laser beam reflecting in a wrong direction within a marking unit). However, in particular implementations, a door 48 may be used on the marking unit 24 between the marking unit 24 and the tag receiver 14. The door 48 may be configured in any of a variety of different ways and opened and closed through a number of different actuators. The following paragraph includes some examples.

In a first implementation, the door 48 is pivotally coupled to the marking unit 24 wall and activated by the movement of the tag holder 50 toward and away from the wall (i.e. through mechanical coupling to the door 48 or through an electronic sensor and motor to open and close the door 48). In a second implementation, the door is hingedly mounted to an outside surface of the wall with a spring biased hinge biasing the door closed such that when the tag holder extends to its extended position, the door is pushed open by the tag holder and when the tag holder retracts, the door is biased closed. In a third implementation, the door is axially pivotally coupled to the tag holder at its distal end such that when the tag holder retracts to its retracted position ready for marking, the door is closed and in contact with the outer wall of the marking unit. If the marking unit implementation is one that is capable of marking both sides of the tag, the tag holder can still pivot 180 degrees if the distal end of the tag holder is axially pivotally coupled to the door.

Figure 11A:
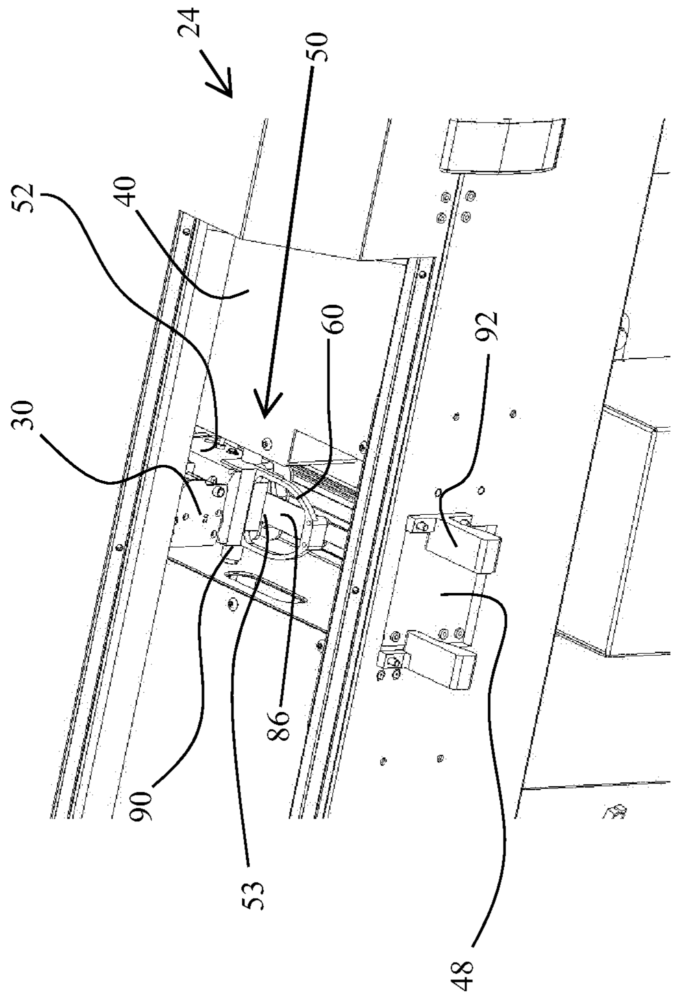
FIG. 11A illustrates a particular implementation of a tag marking kiosk marking unit with the tag holder in its inverted retracted position.

After the first side 84 of the pet tag 53 is marked (FIG. 10C), if the kiosk 2 is configured for marking both sides of the tag 53, the tag holder arm 52, responsive to the gear head 56, may be configured to rotate 180 degrees to position the second side 86 of the pet tag 53 (see FIG. 11A) for marking the second side 86 with the marking implement 30. In FIG. 11A, one reason for the support 60 extending around the marking area of the tag 53 so that the space below the tag 53 in the holder is open is illustrated. By configuring the support to avoid the marking area of the tag 53, the second side 86 of the tag 53 may be marked when the tag 53 is turned over by the tag holder 50.

As an alternative to turning the tag over to mark its second side, the kiosk 2 may be configured with a second marking implement to mark the second side either simultaneous with a first marking implement marking the first side or subsequent to it. Although this approach would be more expensive, it also may be faster in certain implementations. As another alternative, a single laser with a beam splitter and controllable mirrors to direct the laser beam to mark a second side of the tag without moving the tag is contemplated. Those of ordinary skill in the art will readily understand the many possibilities and other alternative equivalent approaches for marking tags through a public use kiosk upon review of the principles disclosed herein.

In this particular implementation, after the tag 53 is done being marked (single or both sides), the tag holder arm 52, responsive to the controller, moves toward a position at the tag receiver 14 (FIG. 1). As the tag holder 50 moves toward the tag receiver 14, the door 48 (if included) opens to allow passage of the tag holder 50, and the tag 53 is physically ejected from the tag holder 50. In particular implementations of a tag marking kiosk to minimize the yaw of a tag 72 on a receiving pin 66 during marking of the tag, relatively tight tolerances are used on the collar ring hole 74 and tag alignment feature 76 in relation to the receiving pin 66 and pin alignment feature 70. As such, the tag may have a tendency to bind and remain on the alignment pin. To assist in releasing the tag 53 from the alignment pin 66, an ejection mechanism may be included in the kiosk 2.

Figure 11C:
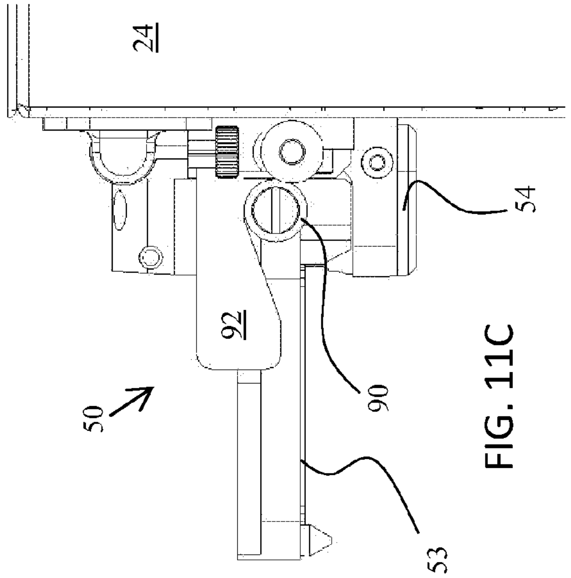
FIG. 11C illustrates a side view of FIG. 11B.
Figure 11B:
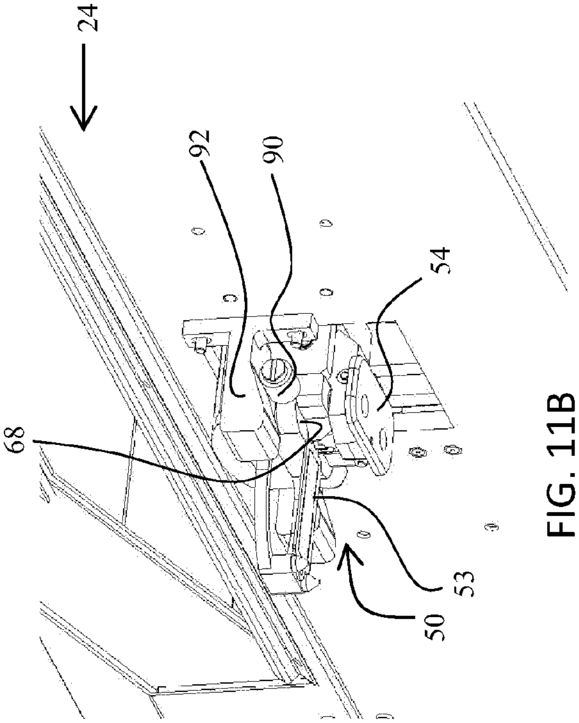
FIG. 11B illustrates a perspective view of a particular implementation of a tag marking kiosk marking unit with the tag holder beginning to extend.

Although there are many approaches to ejecting a tag from a tag holder, in the particular implementation illustrated in FIGS. 11A to 11E, one or more cam followers 90 are included on one or more sides of the tag holder 50. The cam followers 90 are fixedly coupled to the tag support 68 of the tag holder 50 and are biased into a receiving position (FIGS. 6B and 11C are both in receiving position) for the cam followers 90. With reference to FIGS. 11B and 11C, as the tag holder 50 moves forward it begins to contact the one or more ejection cams 92 adjacent the opening on the marking unit 24.

Figure 11E:
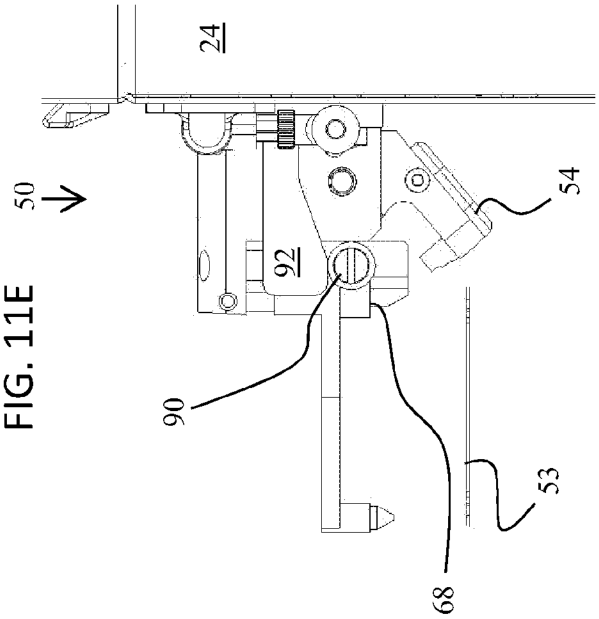
FIG. 11E illustrates a side view of FIG. 11D.
Figure 11D:
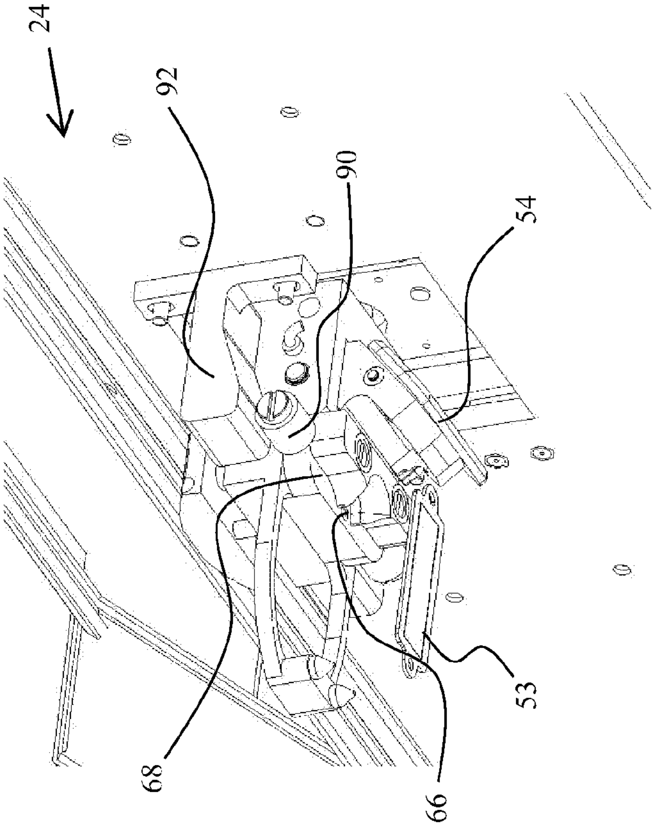
FIG. 11D illustrates a perspective view of a particular implementation of a tag marking kiosk marking unit with the tag holder extended and releasing the pet tag.

With reference to FIGS. 11D and 11E, as the tag holder 50 continues to move forward, the cam follower 90 follows the ejection cam 92 which, because it is fixedly coupled to the tag support 68, moves the tag support 68 in the direction of the ejection cam 92 surface. The tag support 68, however, is moveably mounted with respect to the receiving pin 66 and the receiving pin 66 does not move with the cam follower 90. As a result, when the tag support 68 moves, the amount of the receiving pin 66 protruding from the tag support 68 reduces. The ejection cam 92, for this particular implementation, is configured to cause the cam follower 90 and tag support 68 to move to a point where, as shown in FIG. 11D, the receiving pin 66 protrudes only a very little or not at all from the tag support 68. This causes the tag 53 to be physically ejected from the receiving pin 66 and prevents binding. Additionally, as shown in FIGS. 11D and 11E, the clamp 54 is pushed away from the tag support 68 when the cam follower 90 follows the ejection cam 92. The clamp 54 is biased with a mechanism that for a first range of its motion biases the clamp 54 shut, and for a second range of its motion biases the clamp 54 open. When the tag 53 is ejected from the receiving pin 66, the clamp 54 is past the point where it is biased open and is, therefore, reset into its initial position by this same motion. After the tag is ejected, the tag holder returns to its position inside the kiosk 2 to await another request to mark a tag from another customer.

Figure 12:
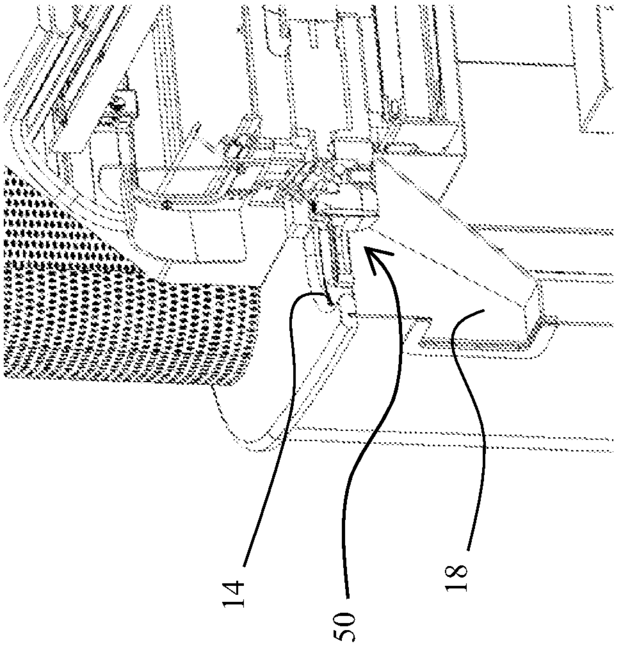
FIG. 12 illustrates a sectional view of the particular implementation of FIG. 1 with the pet tag marking kiosk sectioned down the center of the tag return.

FIG. 12 illustrates a sectional view of the particular implementation of FIG. 1 with the pet tag marking kiosk 2 sectioned down the center of the tag return 18. By placing the tag return 18 below the tag receiver 14, and in particular implementations like FIG. 12 directly vertically below the tag receiver 14, at least two advantages are achieved. First, the tag is returned to the customer without extensive additional movement by the tag holder 50. The tag holder 50, in its inverted position (like when it is marking the second side of the tag) simply releases or ejects the tag and it falls to the tag return 18. Second, if, when a customer is placing the tag on the receiving pin the customer has improperly placed the tag or places it misaligned with an alignment feature on the receiving pin, the tag will simply fall below the tag receiver 14 into the tag return 18 to indicate that the tag was improperly placed. Although it is not shown in the particular implementation of FIG. 12, an optional tag return door may be provided over the tag return to reduce the likelihood that the customer's tag falls out of the tag return 18 when it drops there.

Although many of the aspects relating to a pet tag marking kiosk may be implemented using any type of marking method including, but not limited to, stamping, imprinting with heat or ink, embossing, etching using a stylus, or the like, many of the particular implementations described herein are described in relation to a laser marking tool. Unless otherwise expressly stated, this is not intended to imply that any particular implementation is limited to use with a laser marking tool.

In particular implementations of a tag marking kiosk, particularly those involving a mechanical stylus as a marking implement, a marking table support or tag carrier may be used. In other particular implementations, particularly those involving a laser marking implement, a marking table or carrier may not be used at all. For example, through use of a clamp that clamps a tag to be marked, the tag may be marked using a laser marking tool without the need for fixed back support against the tag. Because a laser marking tool does not press against the tag during a marking process, significant support is not needed for the tag and may be provided simply by the clamping device even only on one side of the tag. This configuration also simplifies the flipping of the tag. In another particular implementation, rather than a clamp, a slight vacuum is used to hold a tag in place. For a laser marking kiosk with a long depth of focus, precise Z-plane placement of the component to be marked and rear support for the component is not as essential as it is with mechanical stylus marking implements. Conventional marking kiosks use a sturdy marking table, among other reasons, because of conventional importance placed on maintaining sufficient support for the component to be marked and the need for precise Z-plane placement.

As will be clear by the examples provided herein, the particular angle at which the tag is marked is not essential to a functional tag marking kiosk. For example, the tag may be mounted vertically, such as on an internal wall of the system, or suspended vertically or horizontally or at some other angle for marking the tag. In particular implementations where metal shavings debris is generated during the marking process, vertical mounting or suspension may assist in debris removal through gravity. In yet another non-limiting example, the tag marking table may be extended and the consumer may be requested to turn the tag over for marking on the reverse side.

In implementations where a stylus or other marking implement that generates debris through the marking process is used and the tag is seated on a marking table or other carrier, it may be desirable to remove or otherwise capture the debris from an etching process to reduce its interference with placement of the tag. For example, if a conventional tag marking kiosk that only marks one side of a tag were adapted, using the principles taught in relation to particular implementations herein, to also be capable of automatically marking a second side of the tag, the debris caused from the marking process on the first side may be dropped to the marking table when the tag is flipped over. The debris, in particular implementations, may cause interference with replacement of the tag on the table for marking or for placement of another tag in its holder at the start of a marking process. There may be a need to remove this debris.

Debris may be removed using many different methods including, but not limited to, use of the flipping arm to dump the debris at a different location not above the marking table, use of a stream of air to move the debris away from the marking table (during the marking process, after the marking process from the tag surface and/or from the marking table while or after the debris has settled), or through a marking table surface that does not become littered with the debris such as through leaving openings in the marking table through which the debris may fall or be blown. Other ways to remove debris may involve brushing the surface of the tag surface or tapping or shaking the tag to disperse any debris on its surface in a controlled location prior to or after marking the second side of the tag. Other methods of removing debris and avoiding debris build-up will become apparent from review of this disclosure and recognition of this concern disclosed herein. Unlike the mechanical stylus-type marking kiosks that generate metal shavings as debris, laser etching-type systems generate debris as vapor that, according to particular implementations of marking kiosks disclosed herein, may be removed from the marking area through an air filter and air stream.

In a particular method of marketing a tag marking kiosk system, the control system for the tag marking kiosk comprises a random or periodic generator that generates a bonus, an award, or other tag message different from the tag requested by the customer or different from the messages or images offered to the general public. The rarity of the message or image may affect how the tags are purchased. The programming may be configured to indicate to the customer after the customer has committed to marking the purchased tag that the customer is a winner, or that the customer has received one or more additional bonus tags or that the customer has additional options for marking the tag not available to others. For tag marking kiosks comprising a printer, the bonus may be printed on a bonus coupon for later redemption with a promotional code.

In particular implementations, the customer may be given the specific option to personalize or customize the image to be placed on the tag. For example, without limitation, the customer may be given the option to upload a photograph or other graphic to the marking kiosk that is marked on the tag.

It will be understood that implementations are not limited to the specific components disclosed herein, as virtually any components consistent with the intended operation of a method and/or system implementation for a tag marking kiosk may be utilized. Accordingly, for example, although particular tag marking kiosk implementation components may be disclosed, such system components may comprise any shape, size, style, type, model, version, class, grade, measurement, concentration, material, weight, quantity, and/or the like consistent with the intended operation of a method and/or system implementation for a tag marking kiosk.

In places where the description above refers to particular implementations of tag marking kiosks and pet tag marking kiosks as specific examples of how particular implementations may be used, it should be readily apparent that a number of modifications may be made without departing from the spirit thereof and that these implementations may be applied to other systems including marking kiosks for marking other small objects that are not intended for use as pet tags or even tags at all. For example, it is specifically contemplated that the marking kiosk may be used for marking luggage tags, people jewelry, key chains, plaques, small electronics (such as an iPod or a cellular phone or other case), and other markable surfaces which may be marked using a laser or mechanical stylus. The terminology relating to pet tags and tags throughout this disclosure may be substituted for any other workpiece in need of marking for application in marking other types of workpieces beyond tags and pet tags. Modification of the holder and openings, in many implementation, is all that is needed to modify the specific implementations disclosed for use with marking other workpieces. The accompanying claims are intended to cover such modifications as would fall within the spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A public use pet tag marking kiosk, comprising:

a housing;

a tag receiver in a fixed position on an outside of the housing and accessible to a customer from outside the housing;

a marking implement enclosed within the housing, the housing and tag receiver forming a protective barrier such that the customer cannot access the marking implement from outside the housing, the marking implement responsive to signals received from a controller;

a graphical user interface coupled to the housing and responsive to the controller, the graphical user interface configured to prompt a customer to put the pet tag in the tag receiver and to supply information about an image to mark on a pet tag; and a tag holder within the housing, the tag holder configured to extend to the tag receiver in response to instructions received from the controller, receive the pet tag from the customer from outside the housing through the protective barrier via the tag receiver, and move the pet tag to a marking position, wherein the tag holder extends vertically to the protective barrier and comprises a receiving pin having an alignment feature extending therefrom, the receiving pin and alignment feature combination comprising a cross-sectional shape that:

is asymmetrical for all cross sections of the shape when the alignment feature extends vertically with respect to the receiving pin; and is asymmetrical for all but not more than two cross sections of the shape when the alignment feature extends non-vertically with respect to the receiving pin.

2. The public use pet tag marking kiosk of claim 1, wherein the tag holder is configured to move the pet tag to the marking position by retracting to the marking position.

3. The public use pet tag marking kiosk of claim 1, wherein the tag holder is configured to rotate, in response to at least one signal received from the controller, from a first marking position in which a first side of the pet tag is marked to a second marking position in which a second side of the pet tag is marked.

4. The public use pet tag marking kiosk of claim 1, wherein the tag holder is configured to rotate the pet tag, in response to at least one signal received from the controller, from a first marking position in which a first side of the pet tag is marked to a second marking position in which a second side of the pet tag is marked.

5. The public use pet tag marking kiosk of claim 1, wherein the tag holder is configured to suspend the pet tag in a cantilevered manner while marking the pet tag.

6. The public use pet tag marking kiosk of claim 1, the tag receiver further comprising a door having an open position and a closed position, the door responsive to signals received from the controller.

7. The public use pet tag marking kiosk of claim 1, further comprising a door coupled to the tag receiver.

8. The public use pet tag marking kiosk of claim 1, wherein the marking implement is a mechanical stylus.

9. The public use pet tag marking kiosk of claim 1, wherein the marking implement is a laser.

10. The public use pet tag marking kiosk of claim 1, wherein the marking implement is a paint spray marking implement.

11. The public use pet tag marking kiosk of claim 1, wherein the tag holder comprises an alignment feature sized and shaped to mate with an alignment feature associated with a pet tag, wherein the tag holder alignment feature is configured to accept placement of the pet tag in the tag holder with only a first marking surface facing up and reject placement of the pet tag with any other than the first marking surface facing up.

12. A public use pet tag marking kiosk comprising:

a housing;

a tag return in a fixed position on an outside of the housing and accessible to the customer from outside the housing;

a graphical user interface coupled to the housing and responsive to a controller, the graphical user interface configured to prompt the customer to supply information about an image to mark on a pet tag;

a marking implement enclosed within the housing, the housing and tag return forming a protective barrier such that the customer cannot access the marking implement from outside the housing, the marking implement responsive to signals received from the controller; and a tag holder within the housing and responsive to instructions received from the controller, the tag holder configured to receive a pet tag from the customer through the protective barrier, position the pet tag in a first marking position in relation to the marking implement to mark a first side of the pet tag, and automatically dispense the pet tag to the tag return through the protective barrier after the pet tag is marked by the marking implement, wherein the tag holder extends vertically to the protective barrier and comprises a receiving pin having an alignment feature extending therefrom, the receiving pin and alignment feature combination comprising a cross-sectional shape that:

is asymmetrical for all cross sections of the shape when the alignment feature extends vertically with respect to the receiving pin; and is asymmetrical for all but not more than two cross sections of the shape when the alignment feature extends non-vertically with respect to the receiving pin.

13. The public use pet tag marking kiosk of claim 12, wherein the tag holder is further configured to automatically reposition the pet tag within the tag holder to a second marking position in relation to the marking implement to mark a second side of the pet tag different from the first side.

14. The public use pet tag marking kiosk of claim 12, wherein the tag holder is further configured to extend toward the tag return prior to receiving the pet tag from the customer through the protective barrier.

15. The public use pet tag marking kiosk of claim 12, wherein the tag holder is configured to move the pet tag to the marking position by retracting to the marking position.

16. The public use pet tag marking kiosk of claim 12, wherein the tag holder is configured to rotate, in response to at least one signal received from a controller, from the first marking position to a second marking position in which a second side of the pet tag is marked.

17. The public use pet tag marking kiosk of claim 12, wherein the tag holder is configured to suspend the pet tag in a cantilevered manner while marking the pet tag.

18. The public use pet tag marking kiosk of claim 12, the tag return further comprising a door having an open position and a closed position, wherein the customer can access the returned tag when the door is in the open position.

19. The public use pet tag marking kiosk of claim 12, wherein the marking implement is a mechanical stylus.

20. The public use pet tag marking kiosk of claim 12, wherein the marking implement is a laser.

21. The public use pet tag marking kiosk of claim 12, wherein the marking implement is a paint spray marking implement.

* * * * *